US012660013B2

(12) United States Patent (10) Patent No.: US 12,660,013 B2
Guo et al. (45) Date of Patent: Jun. 16, 2026

(54) CONNECTION ESTABLISHMENT METHOD AND DEVICE, STORAGE MEDIUM AND ELECTRONIC DEVICE

(71) Applicant: ZTE Corporation, Shenzhen (CN)

(72) Inventors: Yong Guo, Shenzhen (CN); Bin Tan, Shenzhen (CN); Guangping Huang, Shenzhen (CN); Shaofu Peng, Shenzhen (CN); Bing Huang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 275 days.

(21) Appl. No.: 18/706,224

(22) PCT Filed: Sep. 1, 2022

(86) PCT No.: PCT/CN2022/116592
§ 371 (c)(1),
(2) Date: Apr. 30, 2024

(87) PCT Pub. No.: WO2023/071522
PCT Pub. Date: May 4, 2023

(65) Prior Publication Data
US 2026/0143533 A1 May 21, 2026

(30) Foreign Application Priority Data
Nov. 1, 2021 (CN) .......................... 202111285347.1

(51) Int. Cl.
H04W 76/10 (2018.01)

(52) U.S. Cl.
CPC .................................. *H04W 76/10* (2018.02)

(58) Field of Classification Search
CPC .... H04W 76/10; H04W 48/16; H04L 67/141; H04L 67/51; G06F 13/00; G06F 21/335; G06F 2209/5015; G06F 3/1236
See application file for complete search history.

(56) References Cited

U.S. PATENT DOCUMENTS 6,832,223 B1 * 12/2004 Scheifler ............. H04L 12/2805
709/200
8,271,667 B2 * 9/2012 Hoshino ............. H04L 65/1101
709/227
(Continued)

FOREIGN PATENT DOCUMENTS

CN 104717222 A 6/2015
CN 108134828 A 6/2018
(Continued)

OTHER PUBLICATIONS

International Search Report for corresponding application PCT/CN2022/116592 filed Jan. 9, 2022; Mail date Nov. 22, 2022.
(Continued)

*Primary Examiner* — Dung B Huynh
(74) *Attorney, Agent, or Firm* — CANTOR COLBURN LLP

(57) ABSTRACT

Provided are a connection establishment method and device, a storage medium and an electronic device. In the connection establishment method, a target module acquires a connection request, wherein the connection request is used for requesting establishment of a connection between a terminal application and a target service, and the connection request contains a target service identifier of the target service; and the target module initiates the connection request to the target service based on the target service identifier to request the establishment of the connection between the terminal application and the target service.

18 Claims, 6 Drawing Sheets

(56) References Cited

U.S. PATENT DOCUMENTS

| | | | | |
|---|---|---|---|---|
| 8,732,815 | B2* | 5/2014 | Ogura | G06F 21/31 |
| | | | | 726/8 |
| 9,219,724 | B1* | 12/2015 | Choudhary | H04L 67/53 |
| 9,860,225 | B1* | 1/2018 | Chamberlin | H04L 61/2514 |
| 9,882,957 | B1* | 1/2018 | Mostert | H04L 67/02 |
| 10,045,216 | B1* | 8/2018 | Indurkar | H04W 12/068 |
| 10,674,545 | B2* | 6/2020 | Li | H04W 48/16 |
| 10,715,315 | B1* | 7/2020 | Proctor | H04L 9/3213 |
| 12,574,706 | B2* | 3/2026 | Baek | H04W 4/06 |
| 2002/0024974 | A1* | 2/2002 | Karagiannis | H04L 45/742 |
| | | | | 370/386 |
| 2003/0005106 | A1* | 1/2003 | Isoda | H04L 12/6418 |
| | | | | 709/223 |
| 2003/0163545 | A1* | 8/2003 | Koskelainen | H04L 67/51 |
| | | | | 709/217 |
| 2004/0017809 | A1* | 1/2004 | Park | H04W 8/04 |
| | | | | 370/432 |
| 2005/0025143 | A1* | 2/2005 | Chen | H04L 63/08 |
| | | | | 709/225 |
| 2006/0195660 | A1* | 8/2006 | Sundarrajan | H04L 67/5682 |
| | | | | 711/118 |
| 2007/0293249 | A1* | 12/2007 | Wang | H04L 12/189 |
| | | | | 455/466 |
| 2008/0066156 | A1* | 3/2008 | Ikeda | H04L 63/0876 |
| | | | | 726/3 |
| 2009/0028141 | A1* | 1/2009 | Vu Duong | H04L 47/70 |
| | | | | 370/389 |
| 2009/0077242 | A1* | 3/2009 | Lin | H04L 65/1063 |
| | | | | 709/227 |
| 2009/0089866 | A1* | 4/2009 | Yato | G06F 21/6218 |
| | | | | 726/2 |
| 2010/0046538 | A1* | 2/2010 | Cabrera Escandell | |
| | | | | H04L 47/122 |
| | | | | 370/419 |
| 2010/0067529 | A1* | 3/2010 | Chen | H04L 69/18 |
| | | | | 370/466 |
| 2010/0074256 | A1* | 3/2010 | Seok | H04L 69/22 |
| | | | | 370/392 |
| 2010/0135300 | A1* | 6/2010 | Yoon | H04L 45/306 |
| | | | | 370/392 |
| 2010/0277600 | A1* | 11/2010 | Lee | H04L 67/75 |
| | | | | 348/207.1 |
| 2011/0002301 | A1* | 1/2011 | Chan | H04W 40/34 |
| | | | | 370/329 |
| 2011/0252336 | A1* | 10/2011 | Ishii | G16H 10/60 |
| | | | | 715/745 |
| 2011/0296510 | A1* | 12/2011 | Hatlelid | H04L 63/08 |
| | | | | 726/7 |
| 2011/0320521 | A1* | 12/2011 | Steiner | G06F 9/547 |
| | | | | 709/203 |
| 2012/0082110 | A1* | 4/2012 | Su | H04L 61/2525 |
| | | | | 370/329 |
| 2012/0096525 | A1* | 4/2012 | Bolgert | G06F 11/3006 |
| | | | | 726/6 |
| 2012/0099504 | A1* | 4/2012 | Hyun | H04W 4/06 |
| | | | | 370/312 |
| 2012/0110646 | A1* | 5/2012 | Ajitomi | G06F 21/335 |
| | | | | 726/4 |
| 2012/0136984 | A1* | 5/2012 | Wang | H04L 67/1061 |
| | | | | 709/223 |
| 2012/0236864 | A1* | 9/2012 | Zheng | H04L 69/167 |
| | | | | 370/392 |
| 2012/0240214 | A1* | 9/2012 | Ogura | G06F 21/31 |
| | | | | 726/12 |
| 2012/0311675 | A1* | 12/2012 | Ham | G06F 8/61 |
| | | | | 717/176 |
| 2013/0136145 | A1* | 5/2013 | Bi | H04L 69/22 |
| | | | | 370/475 |
| 2013/0191882 | A1* | 7/2013 | Jolfaei | G06F 21/335 |
| | | | | 726/4 |
| 2014/0123267 | A1* | 5/2014 | Preiss | H04L 63/029 |
| | | | | 726/14 |
| 2014/0162637 | A1* | 6/2014 | Park | H04W 76/14 |
| | | | | 455/434 |
| 2014/0162671 | A1* | 6/2014 | Kim | H04W 4/70 |
| | | | | 455/452.1 |
| 2014/0222952 | A1* | 8/2014 | Suryavanshi | H04W 4/20 |
| | | | | 709/217 |
| 2014/0279872 | A1* | 9/2014 | McLean | G06F 16/178 |
| | | | | 707/610 |
| 2014/0280508 | A1* | 9/2014 | Tsai | H04L 67/303 |
| | | | | 709/217 |
| 2014/0337430 | A1* | 11/2014 | Jo | H04L 61/5069 |
| | | | | 709/204 |
| 2014/0355523 | A1* | 12/2014 | Congdon | H04W 48/12 |
| | | | | 370/328 |
| 2015/0046576 | A1* | 2/2015 | Taniguchi | A63F 13/795 |
| | | | | 709/223 |
| 2015/0058938 | A1* | 2/2015 | Gaspar | H04L 63/0892 |
| | | | | 726/5 |
| 2015/0063372 | A1* | 3/2015 | Yenduri | H04L 41/5051 |
| | | | | 370/463 |
| 2015/0160986 | A1* | 6/2015 | Ni | G06F 9/52 |
| | | | | 718/102 |
| 2015/0180850 | A1* | 6/2015 | Venkataramana | H04L 63/08 |
| | | | | 726/4 |
| 2015/0245390 | A1* | 8/2015 | Lim | H04W 72/20 |
| | | | | 370/329 |
| 2015/0248543 | A1* | 9/2015 | Yoshinari | G06Q 50/10 |
| | | | | 726/28 |
| 2015/0264091 | A1* | 9/2015 | Lin | H04L 65/1073 |
| | | | | 709/228 |
| 2015/0319673 | A1* | 11/2015 | Jin | H04W 4/023 |
| | | | | 370/329 |
| 2016/0007185 | A1* | 1/2016 | Zhu | H04W 8/06 |
| | | | | 455/435.1 |
| 2016/0007399 | A1* | 1/2016 | Lim | H04W 76/14 |
| | | | | 370/329 |
| 2016/0066259 | A1* | 3/2016 | Guo | H04W 48/02 |
| | | | | 370/230 |
| 2016/0150357 | A1* | 5/2016 | Jung | H04W 4/80 |
| | | | | 455/41.1 |
| 2016/0226952 | A1* | 8/2016 | Hong | G06F 21/121 |
| 2016/0353498 | A1* | 12/2016 | Enomoto | H04W 60/04 |
| 2017/0109805 | A1* | 4/2017 | Eisen | G06Q 30/0629 |
| 2017/0180382 | A1* | 6/2017 | Taylor | H04L 12/2803 |
| 2017/0195457 | A1* | 7/2017 | Smith, II | H04L 63/10 |
| 2017/0230467 | A1* | 8/2017 | Salgueiro | H04L 67/10 |
| 2017/0339257 | A1* | 11/2017 | Kanagarathinam | H04L 45/124 |
| 2018/0034809 | A1* | 2/2018 | Lavedrine | H04L 63/0815 |
| 2018/0034858 | A1* | 2/2018 | Gummaraju | H04L 63/08 |
| 2018/0152278 | A1* | 5/2018 | Chen | H04L 67/141 |
| 2018/0176413 | A1* | 6/2018 | Nagasaki | G06F 3/1203 |
| 2018/0213405 | A1* | 7/2018 | Jung | H04W 12/069 |
| 2018/0288611 | A1* | 10/2018 | Amin | H04L 9/3215 |
| 2018/0341520 | A1* | 11/2018 | Zhu | H04L 41/50 |
| 2018/0365256 | A1* | 12/2018 | Wu | G06F 9/445 |
| 2019/0058768 | A1* | 2/2019 | Feijoo | H04L 67/1001 |
| 2019/0089623 | A1* | 3/2019 | Dion | H04L 47/2408 |
| 2019/0182291 | A1* | 6/2019 | Doron | H04L 63/1458 |
| 2019/0199815 | A1* | 6/2019 | Park | H04W 8/00 |
| 2019/0238911 | A1* | 8/2019 | Slutsky | H04N 21/43076 |
| 2019/0268434 | A1* | 8/2019 | Xu | H04L 67/5681 |
| 2019/0273807 | A1 | 9/2019 | Mimran | |
| 2019/0313467 | A1* | 10/2019 | Fujishima | H04L 45/306 |
| 2019/0357136 | A1* | 11/2019 | Li | H04W 48/18 |
| 2020/0005298 | A1* | 1/2020 | Hiura | G06Q 20/32 |
| 2020/0007541 | A1* | 1/2020 | Appiah | H04L 61/3015 |
| 2020/0084631 | A1* | 3/2020 | Zhang | H04W 12/106 |
| 2020/0092722 | A1* | 3/2020 | Hu | H04L 63/123 |
| 2020/0106900 | A1* | 4/2020 | Ando | H04N 1/00474 |
| 2020/0159541 | A1* | 5/2020 | Rudolph | H04L 67/562 |
| 2020/0169609 | A1* | 5/2020 | Wang | H04W 4/60 |
| 2020/0205040 | A1* | 6/2020 | Jin | H04W 36/0033 |
| 2020/0296642 | A1* | 9/2020 | Xu | H04W 72/04 |
| 2020/0304409 | A1* | 9/2020 | Wang | H04L 45/741 |
| 2020/0314459 | A1* | 10/2020 | Moon | H04N 21/4622 |
| 2020/0396136 | A1* | 12/2020 | Tanji | H04L 41/142 |
| 2020/0409893 | A1* | 12/2020 | Puttagunta | H04L 69/16 |

(56)                  References Cited

U.S. PATENT DOCUMENTS

| | | | |
|---|---|---|---|
| 2020/0412554 A1* | 12/2020 | Lee | G06F 16/9035 |
| 2021/0072931 A1* | 3/2021 | Matsushima | G06F 13/00 |
| 2021/0168024 A1* | 6/2021 | Ji | H04L 41/0672 |
| 2021/0184965 A1* | 6/2021 | Wang | H04L 45/42 |
| 2021/0195465 A1* | 6/2021 | Behrens | H04L 67/52 |
| 2021/0234857 A1* | 7/2021 | Nakagawa | H04L 9/3236 |
| 2021/0377357 A1* | 12/2021 | Yao | H04L 63/0815 |
| 2021/0377722 A1* | 12/2021 | Fan | H04W 8/205 |
| 2021/0409315 A1* | 12/2021 | Peng | H04L 45/74 |
| 2022/0095186 A1* | 3/2022 | Zhang | H04W 36/14 |
| 2022/0116134 A1* | 4/2022 | Yu | H04W 40/36 |
| 2022/0174085 A1* | 6/2022 | Jiang | H04L 9/3242 |
| 2022/0217087 A1* | 7/2022 | Yang | H04L 45/76 |
| 2022/0279319 A1* | 9/2022 | Baek | H04W 4/06 |
| 2022/0283881 A1* | 9/2022 | Seshadri | G06F 9/5072 |
| 2022/0295439 A1* | 9/2022 | Zheng | H04W 8/005 |
| 2022/0377840 A1* | 11/2022 | Solano Arenas | H04W 76/45 |
| 2022/0400362 A1* | 12/2022 | Ahmad | H04W 4/50 |
| 2022/0407866 A1* | 12/2022 | Tanutama | H04L 63/0807 |
| 2023/0047783 A1* | 2/2023 | Zong | H04W 4/50 |
| 2023/0100148 A1* | 3/2023 | Lee | H04W 12/108 726/26 |
| 2023/0105706 A1* | 4/2023 | Suga | G06Q 50/10 705/325 |
| 2023/0126656 A1* | 4/2023 | Lu | G06F 3/0482 348/14.03 |
| 2023/0148392 A1* | 5/2023 | Yu | H04L 47/41 |
| 2023/0156005 A1* | 5/2023 | Peng | H04L 63/0892 726/4 |
| 2023/0164521 A1* | 5/2023 | Li | H04W 76/40 370/312 |
| 2023/0216775 A1* | 7/2023 | Xu | H04L 45/0377 370/392 |
| 2023/0239326 A1* | 7/2023 | Zhang | G06F 9/5077 726/1 |
| 2023/0308985 A1* | 9/2023 | De Foy | H04W 40/36 |
| 2023/0344644 A1* | 10/2023 | Luo | H04L 67/55 |
| 2024/0015207 A1* | 1/2024 | Kim | H04L 67/52 |
| 2024/0323798 A1* | 9/2024 | Pateromichelakis | H04W 40/12 |

FOREIGN PATENT DOCUMENTS

| | | |
|---|---|---|
| CN | 109490547 A | 3/2019 |
| CN | 109586973 A | 4/2019 |
| CN | 110198516 A | 9/2019 |
| CN | 110311983 A | 10/2019 |
| CN | 111464573 A | 7/2020 |
| CN | 113343155 A | 9/2021 |

OTHER PUBLICATIONS

Chinese Office Action for corresponding application 202111285347.1, mail date Nov. 1, 2025.

Study on encrypted traffic detection and verification, Specification #:23.787, Dated Jul. 30, 2025.

* cited by examiner

Fig. 1

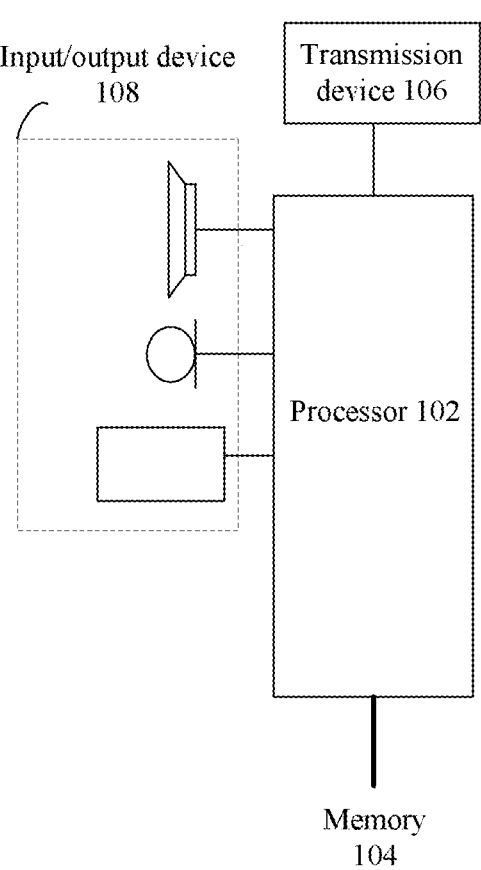

Input/output device 108

Transmission device 106

Processor 102

Memory 104

Fig. 2

A target module acquires a connection request, wherein the connection request is used for requesting establishment of a connection between a terminal application and a target service, and the connection request contains a target service identifier of the target service

S202

The target module initiates the connection request to the target service based on the target service identifier to request the establishment of the connection between the terminal application and the target service

First acquisition unit  —902

Requesting unit  —904

CONNECTION ESTABLISHMENT METHOD AND DEVICE, STORAGE MEDIUM AND ELECTRONIC DEVICE

CROSS-REFERENCE TO RELATED APPLICATION

The present disclosure is a National Stage Filing of the PCT International Application No. PCT/CN 2022/116592 filed on Sep. 1, 2022, which is based on and claims priority to Chinese Patent Application CN 202111285347.1 filed on Nov. 1, 2021 and entitled "Connection Establishment Method and Device, Storage Medium and Electronic Device", the disclosure of which is incorporated herein by reference in its entirety.

TECHNICAL FIELD

Embodiments of the present disclosure relate to the field of communications, and in particular, to a connection establishment method and device, a storage medium and an electronic device.

BACKGROUND

With the digitization transformation of industries and societies, the digital economy makes network infrastructures continue to be deeply integrated with information such as computational power, storage and content, and drives the transformation of human economic forms from industrial economy to information economy, knowledge economy, and smart economy, greatly reducing social transaction costs and improving resource optimization efficiency. Therefore, in the future, network connections will not only involve traditional physical nodes and devices, but also involve more diverse and heterogeneous data, as well as virtualized cloud resources such as content, computing, storage, and services.

In a traditional host mode, such as an end-to-end communication process (Transport control Protocol (TCP)), it is necessary to determine information of local and remote nodes, such as Internet Protocol (IP) addresses and port numbers of the local and remote nodes, and identify a unique connection by a 5-tuple (source and destination IP addresses, source and destination port numbers, TCP protocol, and User Datagram Protocol (UDP)). Therefore, before this process may be executed, it is necessary to first retrieve the corresponding server IP address based on a service provider's domain name through a Domain Name System (DNS) system. Since this method in the related art requires establishing a connection between the terminal application and the service based on the service provider's IP address, the terminal application and the service need to determine location information of the service provider through the DNS system before establishing the connection. In addition, because the current DNS mechanism is bounded with the service provider's identity, it is not possible to select the service from other providers and the terminal has to be fixed to a single provider when using the service. Additionally, because DNS has no network status information, it is impossible to select an appropriate service provider and an appropriate location of a service provider based on the network status, which makes it impossible to achieve service acquisition at any time and place, thus affecting the efficiency of service acquisition. Furthermore, when the IP address of the single service provider changes, the connection between the terminal application and the service needs to be re-established, and the service is interrupted. Therefore, the connection establishment method in the related art leads to easily interrupted connections and low connection efficiency.

At present, there is no effective solution to the problem of easily interrupted connections caused by changes in a location of a target service in the related art.

SUMMARY

Embodiments of the present disclosure provide a connection establishment method and device, a storage medium and an electronic device, which may at least solve the problem of easily interrupted connections caused by changes in a location of a target service in the related art.

According to an aspect of the embodiments of the present disclosure, a connection establishment method is provided, including: acquiring, by a target module, a connection request, wherein the connection request is used for requesting establishment of a connection between a terminal application and a target service, and the connection request contains a target service identifier of the target service; and initiating, by the target module, the connection request to the target service based on the target service identifier to request the establishment of the connection between the terminal application and the target service.

According to another aspect of the embodiments of the present disclosure, a connection establishment device is provided, which is provided in a target module and includes: a first acquisition unit, configured to acquire a connection request, wherein the connection request is used for requesting establishment of a connection between a terminal application and a target service, and the connection request contains a target service identifier of the target service; and a requesting unit, configured to initiate the connection request to the target service based on the target service identifier to request the establishment of the connection between the terminal application and the target service.

According to still another aspect of the embodiments of the present disclosure, a computer-readable storage medium is also provided. The computer-readable storage medium stores a computer program, wherein the computer program, when running on a processor, causes the processor to implement the operations of any one of the method embodiments.

According to still another aspect of the embodiments of the present disclosure, an electronic device is also provided. The electronic device includes a memory and a processor, wherein the memory stores a computer program, and the processor is configured to run the computer program so as to execute the operations in any one of the method embodiments.

BRIEF DESCRIPTION OF THE DRAWINGS

Drawings, provided for further understanding of the present disclosure and forming a part of the description, are used to explain the present disclosure together with exemplary embodiments of the present disclosure rather than to limit the present disclosure. In the drawings:

FIG. 1 is a block diagram showing a hardware structure of a mobile terminal for implementing a connection establishment method according to some embodiments of the present disclosure;

FIG. 2 is a flowchart of a connection establishment method according to some embodiments of the present disclosure;

FIG. 9 is a structural block diagram of a connection establishment device according to some embodiments of the present disclosure.

DETAILED DESCRIPTION

Figure 3:
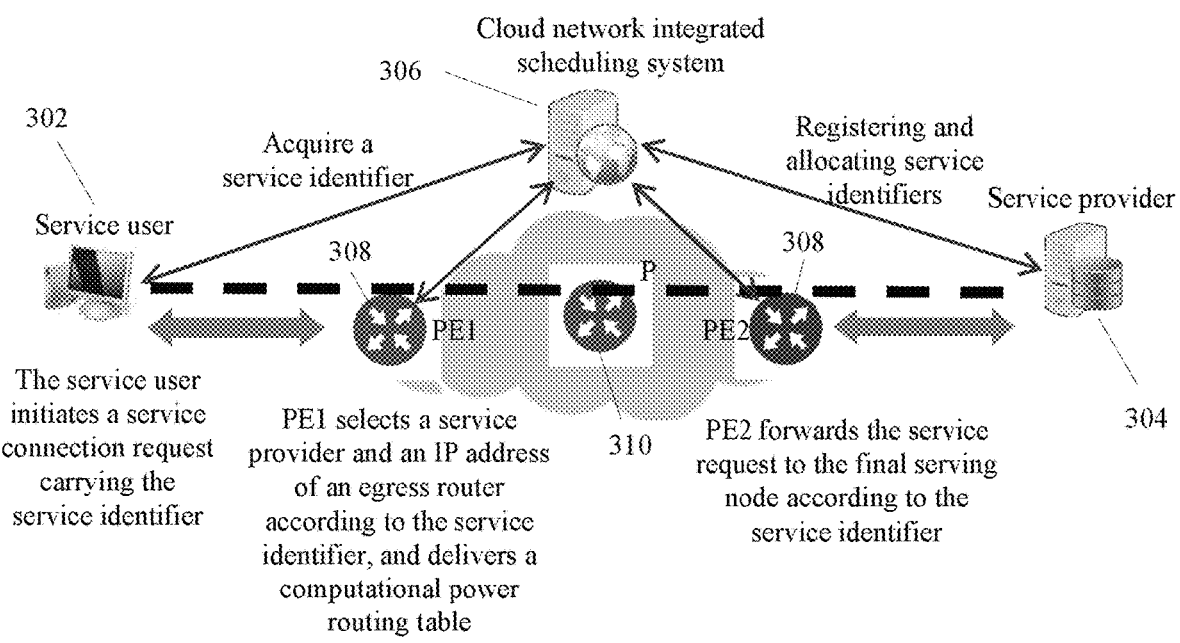
FIG. 3 is a diagram showing a system architecture in which connection establishment is performed according to some exemplary embodiments of the present disclosure.

In order to make those having ordinary skill in the art better understand the present disclosure, the following description, in conjunction with the accompanying drawings in the disclosed embodiment, presents a clear and complete explanation of the technical solution in the disclosed embodiments. It is evident that the described embodiments are only a part of the embodiments disclosed, not the entirety. Based on the disclosed embodiments, all other embodiments obtained by those having ordinary skill in the art without inventive effort should be within the scope of protection of the present disclosure.

It should be noted that, terms such as "first" and "second" in the description, claims, and accompanying drawings of the present disclosure are used to distinguish similar objects, but are not necessarily used to describe a specific sequence or order. It should be understood that the data so used may be interchanged where appropriate so that the embodiments of the present disclosure described herein may be implemented in sequences other than those illustrated or described herein. In addition, the terms "include" and "have", and any variations thereof, are intended to cover a non-exclusive inclusion, for example, a process, method, system, product, or device that includes a series of operations or units is not necessarily limited to those operations or units that are expressly listed, but may include other operations or units that are not expressly listed or inherent to such process, method, product, or device.

The method embodiments provided in the embodiments of the present disclosure may be implemented in a mobile terminal, a computer terminal, or a similar computing device. Taking the operation on a mobile terminal as an example, FIG. 1 is a block diagram showing a hardware structure of a mobile terminal for implementing a connection establishment method according to some embodiments of the present disclosure. As shown in FIG. 1, the mobile terminal may include one or more (only one is shown in FIG. 1) processors 102 (each processor 102 may include but is not limited to a processing device such as a microprocessor (e.g., Micro Controller Unit (MCU)) or a programmable logic device (e.g., Field Programmable Gate Array (FPGA)) and a memory 104 configured to store data. The mobile terminal may further include a transmission device 106 for implementing a communication function, and an input/ output device 108. Those having ordinary skill in the art may understand that the structure shown in FIG. 1 is merely exemplary, which does not limit the structure of the foregoing mobile terminal. For example, the mobile terminal may further include more or fewer components than shown in FIG. 1, or have a different configuration from that shown in FIG. 1.

The memory 104 may be configured to store a computer program, for example, a software program and a module of application software, such as a computer program corresponding to the connection establishment method in the embodiments of the present disclosure. The one or more processors 102 may run the computer program stored in the memory 104, so as to execute various function applications and data processing, that is, to implement the foregoing connection establishment method. The memory 104 may include high-speed random access memory, and may also include non-volatile memory, such as at least one magnetic storage device, flash memory, or other non-volatile solid-state memory. In some instances, the memory 104 may further include a memory remotely located with respect to the one or more processors 102, which may be connected to the mobile terminal over a network. Examples of such network include, but are not limited to, an internet, an intranet, a local area network, a mobile communication network, and combinations thereof.

The transmission device 106 is configured to receive or transmit data via a network. Specific examples of the described network may include a wireless network provided by a communication provider of the mobile terminal. In an example, the transmission device 106 may include a Network Interface Controller (NIC) that may be coupled to other network devices via a base station to communicate with the Internet. In an example, the transmission device 106 may be a Radio Frequency (RF) module configured to communicate with the Internet wirelessly.

The embodiments of the present disclosure provide a connection establishment method. FIG. 2 is a flowchart of a connection establishment method according to some embodiments of the present disclosure. As shown in FIG. 2, the flow includes the following operations S202 to S204.

In operation S202, a target module acquires a connection request, wherein the connection request is used for requesting establishment of a connection between a terminal application and a target service, and the connection request contains a target service identifier of the target service.

In operation S204, the target module initiates the connection request to the target service based on the target service identifier to request the establishment of the connection between the terminal application and the target service.

By means of the described operations, the target module can initiate the connection request to the target service based on the target service identifier, so as to establish a connection between the terminal application and the target service. In the related art, the location of a service provider needs to be determined by a DNS system before a connection is established, or a connection needs to be established based on an IP address of the service provider, both situations may result in easily interrupted connections and low connection efficiency. The technical solution provided in the above embodiment of the present disclosure may address such a problem, and achieve connection establishment based on the target service identifier. Since the connection establishment is independent of the location and the identity of the service provider, the problem of easily interrupted connections caused by changes in a location of a target service in the related art may be solved, thereby achieving the effect of improving the network connection efficiency.

The described operations may be executed by, but are not limited to be performed by, the described target module, or other network functional modules, or a network terminal, or other processing devices or processing units with similar processing capabilities. The solution of the embodiments of the present disclosure is described as follows by taking the implementation of the foregoing operations by a target module as an example (the foregoing operations being performed by the target module is only an example, and in actual implementations, the foregoing operations may alternatively be performed by another device or module).

In the described embodiment, the target module acquires the connection request used for requesting establishment of a connection between a terminal application and a target service. For example, the target module acquires a service connection request from a service user (also referred to as a service consumer), and the service connection request carries (i.e., contains) the target service identifier, wherein the target service identifier has a characteristic of being location and identity independent, i.e., the target service identifier does not contain the identity and specific location information of a service provider. The target module initiates a connection request to the target service based on the target service identifier, so as to request establishment of a connection between the terminal application and the target service, thereby achieving the purpose of not requiring to acquire the identity and location of a service and data provider in advance during a connection request stage, therefore, the problem of easily interrupted connections caused by changes in a location of a target service in the related art may be solved, and the effect of improving the network connection efficiency may be achieved.

In an exemplary embodiment, when the target module includes a first module and the first module includes a service-agnostic service connection application programming interface, a service aware connection state management module, a service aware connection transport control module and a network transport connection interface module, the connection establishment method further includes: after acquiring the connection request initiated by the terminal application via the service-agnostic service connection application programming interface, starting, by the service aware connection state management module, a handshake procedure for service connection and a service connection state management function associated with the target service identifier according to the target service identifier contained in the connection request, and invoking, by the service aware connection state management module, the network transport connection interface module; when the target module includes a second module and the second module includes a service routing management module and a service network policy mapping module, the connection establishment method further includes: after acquiring the connection request from the first module, querying, in a service routing table by the service routing management module, a latest destination service node Internet Protocol (IP) address corresponding to the target service identifier contained in the connection request, and acquiring, by the service routing management module, an egress router IP address and a service route corresponding to the latest destination service node IP address; and selecting, by the service network policy mapping module, a network layer route corresponding to the target service identifier and a network layer service level policy corresponding to the target service identifier. In the embodiment, when the terminal application initiates the connection request through the service-agnostic service connection application programming interface, the service aware connection state management module included in the first module acquires the connection request, and then starts the service connection request and the service connection state management function according to the target service identifier contained in the connection request. For example, the service connection request is initiated in a Transport control Protocol (TCP) handshake procedure, and only contains a service identifier, that is, the service connection request is location and identity independent (i.e., the service connection request is irrelevant to a location and identity of a service provider). In practical applications, when the service provider and the service location change, the connection will not be interrupted. After acquiring the connection request from the first module, the service routing management module in the second module may query the latest destination service node IP address corresponding to the target service identifier according to the target service identifier contained in the connection request. For example, in practical applications, the identity and location information (IP address) of the service provider may be queried from a cloud network integrated scheduling system according to the service identifier, and the service network policy mapping module in the second module may query the identity and IP address of an optimal service provider from the cloud network integrated scheduling system through the edge device of the network. In some exemplary implementations, the service network policy mapping module in the second module may also determine the address of the egress router corresponding to the server of the service provider according to a routing protocol. By means of the embodiments of the present disclosure, a connection request may be established based on a target service identifier, and establishment of the network connection is made irrelevant to the identity and location of a service provider. Further, the purpose of selecting a service provider and a corresponding network location based on a target service identifier may be realized, and the effect of being resource and service aware, dynamic selecting an optimal service provider, and improving the service quality is also achieved.

In an exemplary embodiment, the service-agnostic service connection application programming interface contains identifiers of required resources and services and related attributes and parameters, and does not contain location information of a service node corresponding to the target service identifier. In the embodiment, the service-agnostic service connection application programming interface only includes the service identifiers, attributes and parameters related to the required resources and services, and does not include the identities and locations of the resources and service providers, so that the service-agnostic service connection application programming interface may also be referred to as a location and identity independent service connection application programming interface. With the embodiments of the present disclosure, a location and identity independent service connection request may be implemented.

In an exemplary embodiment, the connection establishment method may further include: the service aware connection state management module performs service connection state management on a connection according to the target service identifier contained in the connection request, wherein the service connection state management at least includes at least one of: mobility management, streaming media management, deterministic management, and multi-connection management. In the embodiment, the service aware connection state management module manages the connection in terms of mobility, streaming media, deterministic, multi-connection, etc. In practical applications, the service aware connection state management module may complete service aware connection management and service aware connection control functions according to parameters transmitted by the service-agnostic service connection application programming interface; and the service aware connection management performs customized connection management for required services in terms of mobility, streaming media, deterministic, and multi-connection. By means of the embodiments of the present disclosure, the purpose of managing a connection based on a target service identifier is achieved.

In an exemplary embodiment, the service routing management module acquires the service routing table corresponding to the target service identifier and the network layer service level policy corresponding to the target service identifier through a network centralized controller via an out-of-band method, or acquires the service routing table corresponding to the target service identifier and the network layer service level policy corresponding to the target service identifier through distributed routing advertisement protocol. In the embodiment, the service routing management module may be delivered by the centralized controller to the edge network device in an out-of-band manner, or a service routing table is acquired by means of a distributed service routing advertisement protocol, and may be issued by a centralized controller to an edge network device in an out-of-band manner and indexed by the service identifier carried in the connection request, so that a network layer service level policy (or referred to as Service Level Agreement (SLA) policy) related to the service. In practical applications, the service routing management module manages the service route and the network layer service level policy (including a destination node address and ingress and egress router addresses associated with the service identifier, and a network layer service level policy parameter associated with the service identifier) related to the service according to the service identifier carried in the connection request. In addition, the route and the network layer service level policy related to the service may be mapped to the route and the network layer service level policy of the network layer according to the service identifier carried in the connection request. By means of the embodiments of the present disclosure, the object of acquiring a service routing table and a network layer service level policy corresponding to a target service identifier in different manners is achieved.

In an exemplary embodiment, when the second module is located in a network edge ingress router, the operation of querying, in a service routing table, a latest destination service node Internet Protocol (IP) address corresponding to the target service identifier contained in the connection request may include: querying, according to the target service identifier, a service node IP address of an optimal service provider corresponding to a local service routing table; and the operation of acquiring an egress router IP address and a service route corresponding to the latest destination service node IP address may include: determining, according to the network layer service level policy corresponding to the target service identifier, the egress router IP address and the service route corresponding to a server of the service provider, wherein after the connection request reaches an egress router of the service provider, the egress router forwards the connection request to a final serving node of the service provider according to the target service identifier. In the embodiment, when the second module is located in the network edge ingress router, the service routing management module queries the service node IP address of the optimal service provider corresponding to the local service routing table according to the target service identifier. For example, when the connection request transmitted over the network reaches the ingress router, the device proxy of the ingress router of the network queries the service node IP address of the optimal service provider corresponding to the local service routing table according to the service identifier, and determines an address of an egress router corresponding to the server of the service provider according to a routing protocol. After the service connection request reaches the egress router of the service provider, the egress router forwards the service connection request to a final server of the service provider according to the service identifier. By means of the embodiment, the purpose of querying the latest destination service node IP address and the corresponding egress router IP address and service route according to the target service identifier contained in the connection request is achieved.

In an exemplary embodiment, the connection request further contains other supplementary parameters, wherein the other supplementary parameters include at least one of: an identity identifier for identity verification, a service type for fast policy indexing, and an associated network layer service level policy parameter for detailed queue scheduling. In the embodiment, in addition to the target service identifier, the connection request may further include other supplementary parameters, such as an identity identifier, a service type and an associated network layer service level policy parameter, wherein the identity identifier may be used for identity verification, the service type may be used for fast policy indexing, and the associated network layer service level policy parameter may be used for detailed queue scheduling, etc.

In an exemplary embodiment, before a target module acquires a connection request, the connection establishment method may further include one of: the terminal application generates the target service identifier according to a predetermined algorithm; or the terminal application acquires the target service identifier from a cloud network integrated scheduling system, wherein the cloud network integrated scheduling system generates the target service identifier according to the predetermined algorithm. In practical applications, before requesting a service, a service user (or a terminal application) may generate a target service identifier according to a predetermined algorithm, that is, the target service identifier may be generated locally; alternatively, the target service identifier may be acquired from the cloud network integrated scheduling system, that is, the target service identifier may be queried from the cloud network integrated scheduling system. By means of the embodiment, the object of generating and acquiring a target service identifier locally or by a cloud network integrated scheduling system is achieved.

In an exemplary embodiment, before the target module acquires the connection request, the connection establishment method may further include: a cloud network integrated scheduling system receives a service registration request from a server that provides the target service; and the cloud network integrated scheduling system allocates the target service identifier to the server that provides the target service according to a predetermined algorithm. In practical applications, before a communication connection is established, a service provider (or a server providing a target service) registers a service with a cloud network integrated scheduling system, and the cloud network integrated scheduling system allocates a unique service identifier across the whole network to the server providing the target service.

Apparently, the embodiments described above are merely a part of the embodiments of the present disclosure, rather than all of the embodiments. The technical solution of present disclosure will be specifically described below in conjunction with exemplary embodiments.

In the relevant art, Quick Internet Connection over UDP (QUIC) is a new generation transport layer solution proposed by Google, based on client application layer rather than operating system kernel. In addition to the advantages of flexible deployment and rapid iterative upgrades, the QUIC also improves the transport layer in aspects of low latency acceleration of TCP handshake, built-in encryption for secure transmission and defense against attacks, forward error correction, and multi-stream aggregation. In terms of mobility, the QUIC can quickly restore a connection after IP or port changes based on a local Connection ID for identifying the connection. Although there is some improvement in mobility after adopting the QUIC, the original problems of TCP transport layer in terms of service awareness, DNS resolution, etc. still remain. A Multi-path TCP (MPTCP) aggregates multiple TCP connections to improve the reliability and throughput of single-path transmission. The MPTCP allows the cooperation of the main path TCP with the sub-TCP connections from different paths within the transport layer, and implements load balancing, congestion control, and ordering for multi-path, but the MPTCP still has shortcomings in terms of service awareness and location independence. Other solutions such as Host Identity Protocol (HIP), Locator/ID Separation Protocol (LISP), etc., achieve uninterrupted connections when the location changes through identity and location address independent technologies. The Application-Aware Networking (APN) achieves network-aware applications by carrying an application ID and SLA parameters in an IP extension header, but still has shortcomings in terms of service awareness, is unable to accurately perceive the attributes of services and data, which makes it difficult to provide matching service quality.

To sum up, future network architecture needs to have the following features: (1) having a connection capability for resources and services; (2) having an aware (perception) capability of resources and services; and (3) having a connection capability that is location independent. In order to enable a network to perceive heterogeneous data resources and services, an identification information transfer and interaction mechanism needs to be designed, so as to establish a channel between an application and a network for transferring and interacting attributes of a data transmission unit. The embodiments of the present disclosure mainly describe how to realize the above features.

FIG. 3 is a diagram showing a system architecture in which connection establishment is performed according to some exemplary embodiments of the present disclosure. As shown in FIG. 3, the system includes a service user 302 (corresponding to the described terminal application), a service provider 304 (corresponding to the described server for providing a target service), a cloud network integrated scheduler 306 (corresponding to the described cloud network integrated scheduling system), an edge router (PE) 308 (including the described ingress router and egress router) and a core router 310. Before establishing a communication connection, the service provider registers a service with the cloud network integrated scheduler, and the cloud network integrated scheduler allocates a service identifier (Service ID) unique across the whole network. Before requesting a service, the service user may generate the service identifier locally, or query the service identifier from the cloud network integrated scheduler.

In the present system architecture, a transport layer is used as a channel between an application and a network, and a location and identity independent resource and service identifier and encapsulation, and a corresponding control plane and data plane interaction protocol are provided. The present system will now be described as follows.

The service identifier in the system has a characteristic of being location and identity independent, i.e., the service identifier does not contain the identity of the service provider and the specific location information of the service provider.

After acquiring the service identifier, the service user may initiate a service connection request. For example, the service connection request is initiated in a Transport control Protocol (TCP) handshake procedure, and only contains a service identifier, that is, the service connection request is location and identity independent (i.e., the service connection request is irrelevant to a location and identity of a service provider). Therefore, when the service provider and the service location change, the connection will not be interrupted.

After the service connection request reaches the transport layer, the transport layer may initiate, according to the service identifier, query to a cloud network integrated scheduler for the identity and location information (IP address) of the service provider; or the transport layer may initiate query to the cloud network integrated scheduler through the network edge device PE1, which then returns the identity and IP address of an optimal service provider, and determine, according to the routing protocol, an address of an egress router corresponding to the server of the service provider.

After the location information (IP address) of the egress router of the service provider is acquired, the destination address of the service connection request is modified from the transport layer or the ingress router to the IP address of the egress router of the service provider. After the service connection request reaches the egress router PE2 of the service provider, the PE2 forwards the service connection request to a final server of the service provider according to the service identifier.

After the handshake procedure of the transport layer is completed, all the network layer information such as source IP address, destination IP address, port number, etc. has been determined, and the establishment of the service connection is completed.

Figure 4:
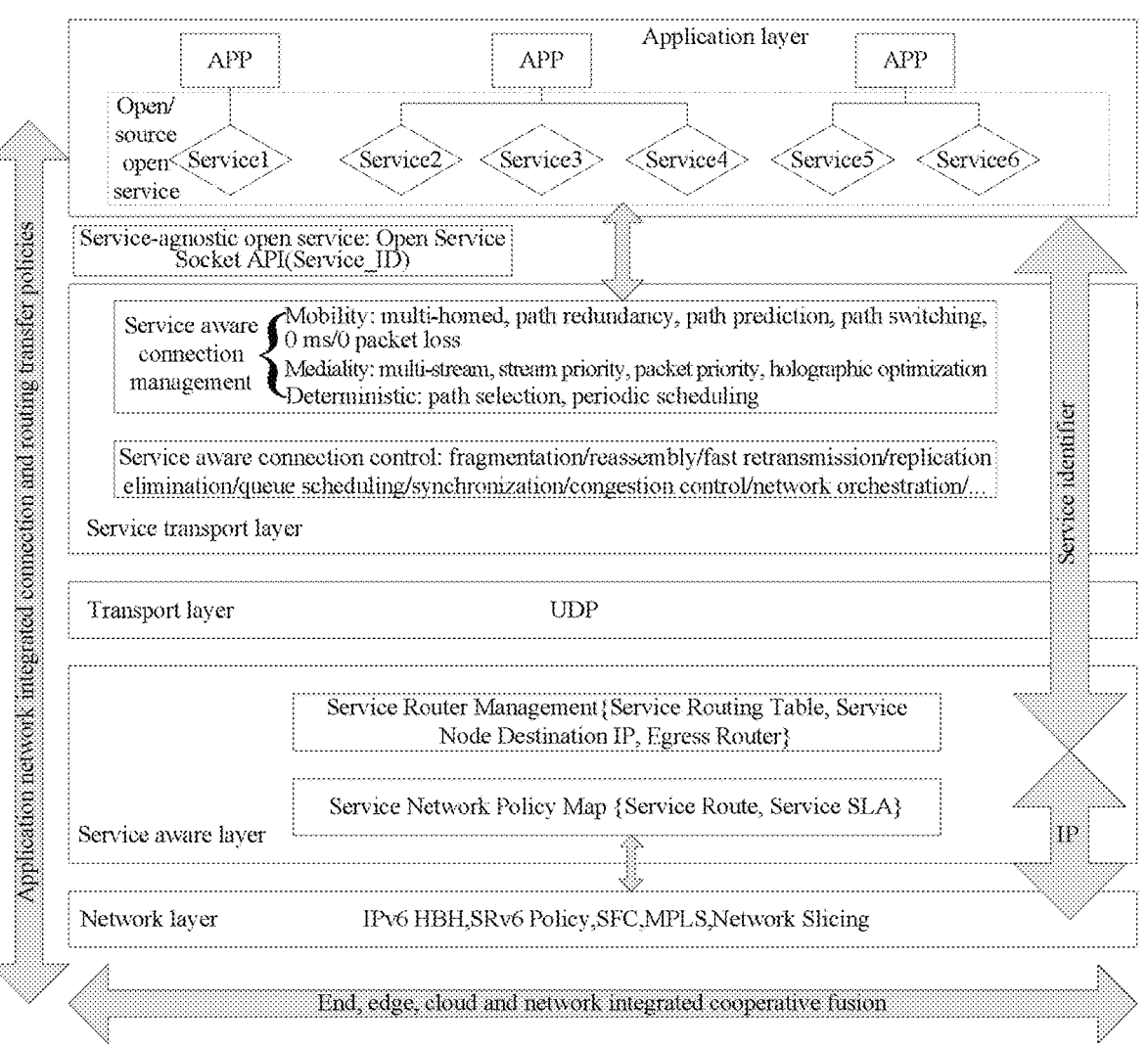
FIG. 4 is an exemplary diagram of a transport layer scheme according to some exemplary embodiments of the present disclosure.

FIG. 4 is an exemplary diagram of a transport layer scheme according to some exemplary embodiments of the present disclosure. As shown in FIG. 4, the functions of various layers and the service flows are now described as follows.

1) The embodiments of the present disclosure relate to two new protocol sub-layers, which are respectively a service transport layer and a service aware layer.

2) The service transport layer is located between an application layer and a transport layer. The service transport layer provides for the application layer a service connection application programming interface which is location and identity independent (i.e., irrelevant to the location and identity), maintains and manages a service aware connection state and a service connection transport control, and invokes a network transport connection application programming interface of a traditional transport layer.

3) The service aware layer is located between the transport layer and a network layer, senses and maintains a service-related routing protocol and routing table and a service SLA policy (corresponding to the described network layer service level policy), and is responsible for mapping the service-related routing and SLA policy to the route and SLA policy of the network layer.

4) When establishing a connection, the application layer invokes a location and identity independent service connection application programming interface, such as a Socket (Service_ID) interface function, of a service transport layer, and initiates a location and identity independent service connection handshake request carrying a service identifier and other service-related parameters to the network layer.

5) The location and identity independent service connection application programming interface only contains the service identifiers and attributes and parameters related to the required resources and services, and does not contain the identities and location information and parameters of the resources and service providers.

6) The service transport layer also completes service aware connection management and service aware connection control functions according to parameters transferred over the location and identity independent service connection application programming interface. The service aware connection management is directed to customized connection management for services that have requirements in aspects of mobility, streaming media, deterministic, etc. The service aware connection control includes customized transport control functions, such as fragmentation, reassembly, sequencing, and congestion control for the services.

7) The service aware layer manages the service-related route and SLA policy according to the service identifier carried in the connection request, wherein the service-related route and SLA policy include a destination node address and ingress and egress router addresses associated with the service identifier, and an SLA parameter associated with the service identifier.

8) The service aware layer further maps the service-related route and SLA policy to the route and SLA policy of the network layer according to the service identifier carried in the associated connection request.

9) A service routing table maintained by the service aware layer may be issued by a centralized controller to an edge network device in an out-of-band manner, or acquired by means of a distributed service routing advertisement protocol.

10) The service-related SLA policy maintained by the service aware layer may be issued to an edge network device by a centralized controller in an out-of-band manner, and may be indexed by the service identifier carried in the associated connection request.

11) When a network transport connection request reaches the ingress router, a device proxy of the ingress router of the network queries a local service routing table according to the service identifier or acquires an address of a service node of an optimal service provider corresponding to the service identifier through querying from a cloud network integral scheduler, and determines an address of the egress router corresponding to a server of the service provider according to a routing protocol. After the service connection request reaches the egress router of the service provider, the egress router forwards the service connection request to a final server of the service provider according to the service identifier.

An embodiment of the present disclosure may be implemented by a method of extending a TCP header.

Figure 5:
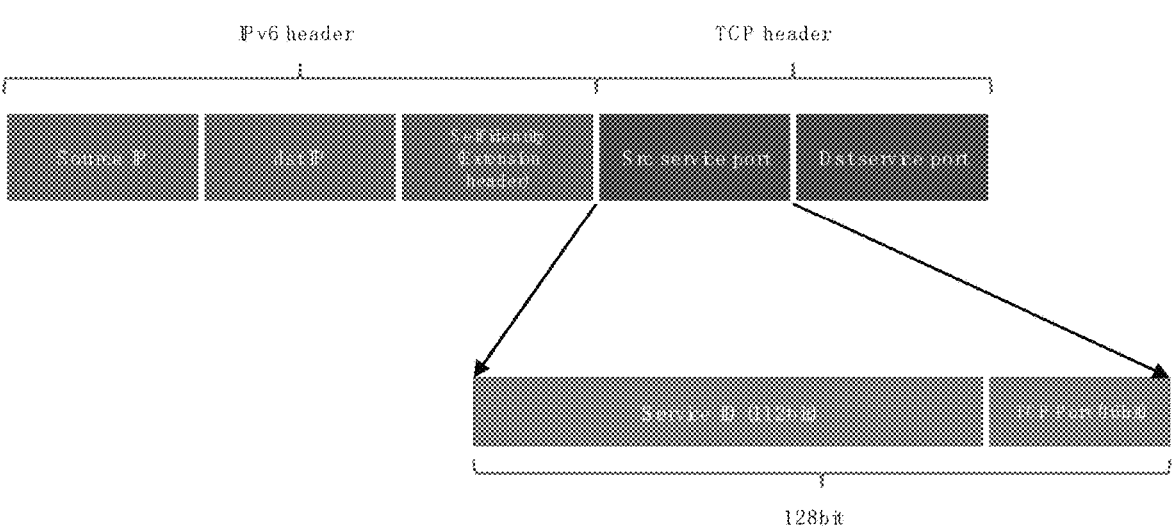
FIG. 5 is an exemplary diagram of a TCP port extension scheme according to some exemplary embodiments of the present disclosure.

In a first method, the TCP port number may be extended from 16 bits to 128 bits. FIG. 5 is an exemplary diagram of a TCP port extension scheme according to some exemplary embodiments of the present disclosure. As shown in FIG. 5, where 0~65535 represents a conventional TCP port, and the extended 112 bits are used for service identification (e.g., carrying a service identifier). The identity identifier may be placed in an extended header of the IPV6 so that the terminal or an intermediate device performs identity verification.

Figure 6:
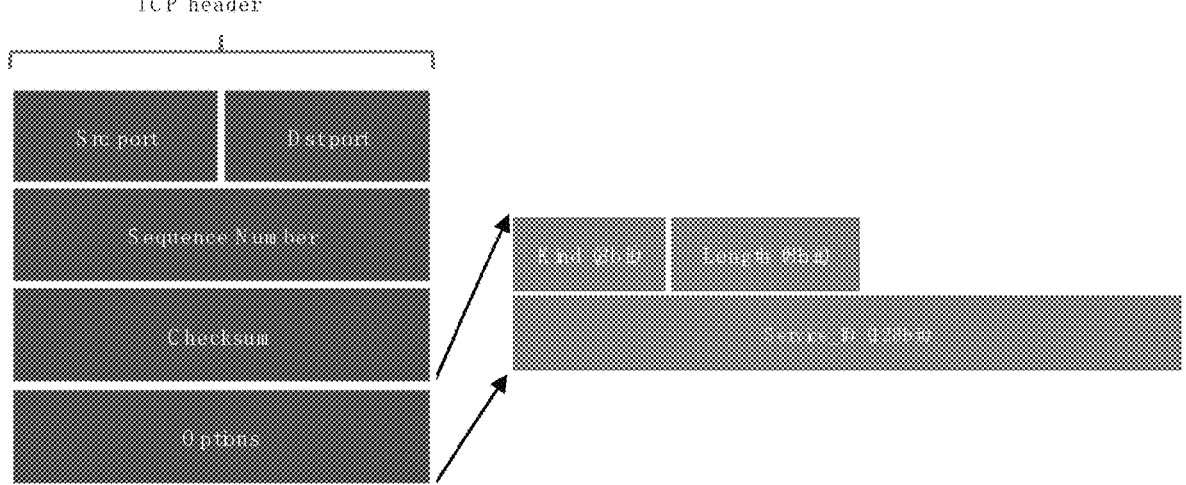
FIG. 6 is an exemplary diagram of a TCP Option extension solution according to some exemplary embodiments of the present disclosure.

In a second method, a service ID is added into a TCP option field. FIG. 6 is an exemplary diagram of a TCP Option extension solution according to some exemplary embodiments of the present disclosure. As shown in FIG. 6, a service ID (128 bit) is added to the options field in a TCP header.

For better understanding of the present disclosure, two exemplary embodiments are described in detail as follows.

First Exemplary Embodiment

Figure 7:
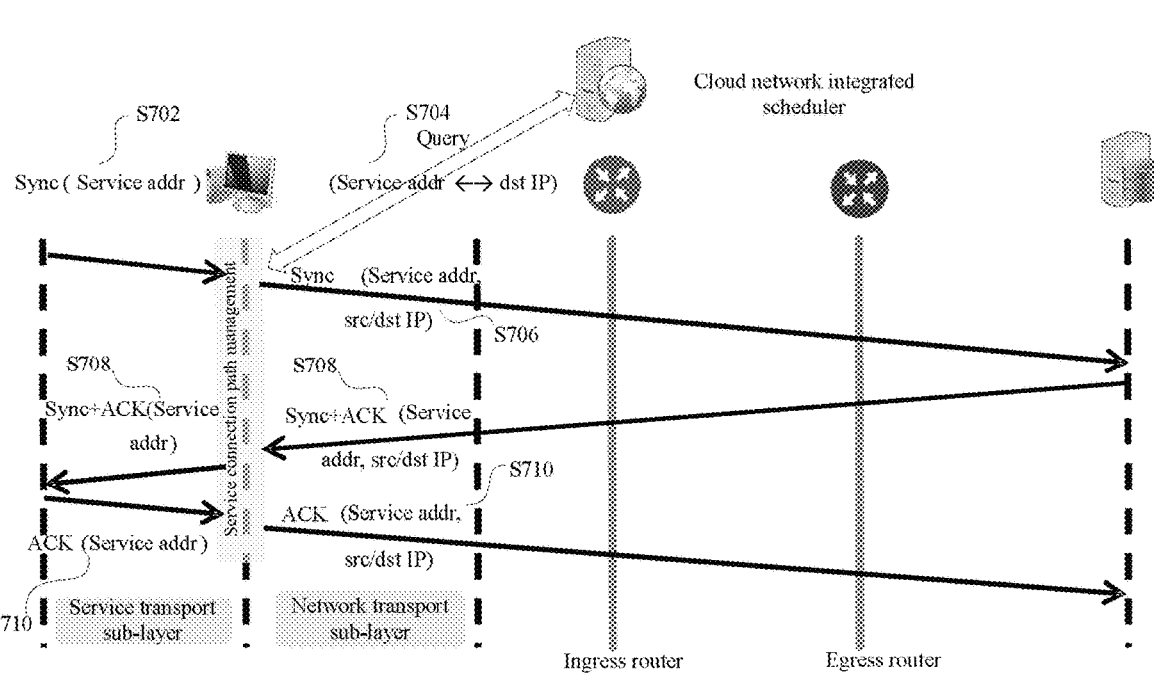
FIG. 7 is a first flowchart of a connection establishment method according to some exemplary embodiments of the present disclosure.
Figure 8:
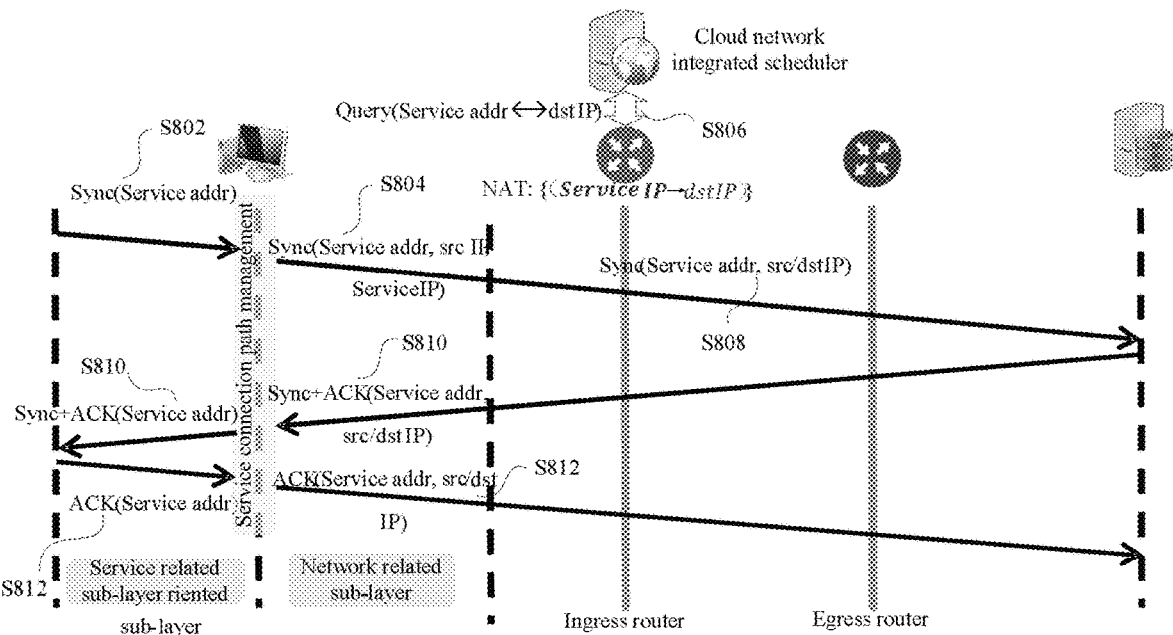
FIG. 8 is a second flowchart of a connection establishment method according to some exemplary embodiments of the present disclosure.

A three-way handshake procedure of TCP is taken as an example for description. FIG. 7 is a first flowchart of a connection establishment method according to some exemplary embodiments of the present disclosure. As shown in FIG. 7 which shows a terminal side process, the process includes the following operations S702 to S710.

In operation S702, an application layer of the terminal initiates a Socket connection, and the first packet is a Sync packet carrying the following parameter: a service identifier (address), which only identifies a service type and a service parameter, but does not identify an identity and a location of a service provider.

In operation S704, after the first packet reaches a service transport layer, the service connection state and management initiates a query to a cloud network integrated scheduler for the identity and location information of the service provider. The cloud network integrated scheduler may select an identity, location IP address and a service providing path of an optimal service provider according to the information and a network state of service providers, and returns a result to the service transport layer of the terminal.

In operation S706, the terminal service sub-layer puts the IP address of the service provider into the Sync packet as a destination address, and continues to forward the service request to the service aware layer and the network layer. The service request Sync packet reaches a final server of the service provider after being forwarded through the ingress router and the egress router of the network.

In operation S708, the final server of the service provider returns a Sync+ACK packet carrying a complete service identifier, a source/destination IP address and port information.

In operation S710, after receiving the returned Sync+ACK packet, the terminal sends a final ACK packet to the server of the service provider to complete the establishment of the connection.

Second Exemplary Embodiment

A network side process in a three-way handshake procedure of a TCP is taken as an example, and the process includes the following operations S802 to S812.

In operation S802, an application layer of a terminal initiates a Socket connection, and the first packet is a Sync packet carrying the following parameter: a service identifier (address), which only identifies a service type and a service parameter, but does not identify an identity and a location of a service provider.

In operation S804, since the service connection state and management does not provide the capability of initiating a query to a cloud network integrated scheduler for the identity and location information of a service provider, after the first packet (i.e., the Sync packet) reaches a service transport layer, the service connection state and management firstly provide a special network service address as a Sync destination IP address.

In operation S806, after the Sync packet reaches the ingress router of the network, the ingress router initiates a query to the cloud network integrated scheduler for the identity and location (IP address) and a service providing path of an optimal service provider according to the service identifier, and returns a result to the ingress router.

In operation S808, the ingress router replaces the special service IP address in the Sync packet with the IP address of the service provider, and continues to forward the service request to the network. The service request Sync packet reaches a final server of the service provider after being forwarded through the ingress router and the egress router of the network.

In operation S810, the final server of the service provider returns a Sync+ACK packet carrying a complete service identifier, a source/destination IP address and port information.

In operation S812, after receiving the returned Sync+ACK packet, the terminal sends a final ACK packet to the server of the service provider to complete the establishment of the connection.

The embodiments of the present disclosure provide a method for implementing a Service Aware Network (SAN), so that data of different granularities, such as data, content and calculation, may be sensed and scheduled by a network in a universal unit identification manner independent of a location and an identity, and may serve as a basis for connection establishment. Moreover, in a connection request phase, it is not necessary to acquire an identity and a location of a service and data provider in advance. The network dynamically selects an optimal service provider and a corresponding network location according to the attributes of the data units, and provides a corresponding network transport mechanism to ensure transmission quality and data security. The following problems in the related art may be avoided. 1) The application needs to determine a location of a service provider through the DNS system before establishing a connection; in addition, because the current DNS mechanism is bounded with the service provider's identity, it is not possible to select the service from other service providers. Additionally, because DNS has no network status information, it is impossible to select an appropriate service provider and a location thereof based on the network status, which makes it impossible to achieve service acquisition at any time and place. 2) When the local IP address or the IP address of the service provider changes, the connection needs to be interrupted and the handshake procedure needs to be performed again, and therefore the service is interrupted. 3) A 5-tuple for identifying a connection does not contain service-related information and parameters, and the network cannot accurately sense attributes of the services and data, and therefore it is difficult to provide matched service quality. By means of the embodiments of the present disclosure, the effects of improvement in aspects, such as mobility, service aware and a DNS resolution mechanism, may be achieved, and the effects, such as service aware and location independence, are further achieved on the basis of supporting multiple connections.

Through the description of the foregoing embodiments, a person having ordinary skill in the art may clearly understand that the connection establishment method according to the foregoing embodiments may be implemented by software in addition to a necessary universal hardware platform, and definitely may also be implemented by hardware. However, in many cases, the former is an exemplary implementation. Based on such understanding, the essence of the technical solutions of the present disclosure or the part contributing to the related art may be embodied in the form of a software product, the computer software product is stored in a storage medium (such as a Read-Only Memory (ROM)/Random Access Memory (RAM), a magnetic disk, and an optical disk), and includes several instructions for instructing a terminal device (which may be a mobile phone), a computer, a server, a network device, or the like.

The embodiments of the present disclosure further provide a connection establishment device, which is provided in a target module. The connection establishment device is used for implementing the described embodiments and exemplary implementations, and what has been described will not be elaborated. The term "module", as used hereinafter, is a combination of software and/or hardware capable of realizing a predetermined function. Although the connection establishment device described in the following embodiment is preferably implemented by software, implementation of hardware or a combination of software and hardware is also possible and conceived.

Figure 9:
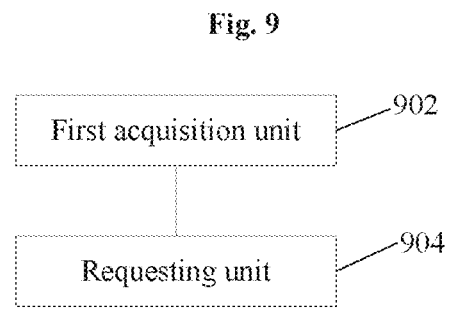

FIG. 9 is a structural block diagram of a connection establishment device according to some embodiments of the present disclosure. The connection establishment device may be provided in a target module. As shown in FIG. 9, the connection establishment device includes:

a first acquisition unit 902, configured to acquire a connection request, wherein the connection request is used for requesting establishment of a connection between a terminal application and a target service, and the connection request contains a target service identifier of the target service; and a requesting unit 904, configured to initiate the connection request to the target service based on the target service identifier to request the establishment of the connection between the terminal application and the target service.

In an exemplary embodiment, when the target module includes a first module and the first module includes a service-agnostic service connection application programming interface, a service aware connection state management module, a service aware connection transport control module and a network transport connection interface module, after acquiring the connection request initiated by the terminal application via the service-agnostic service connection application programming interface, the service aware connection state management module starts a handshake procedure for service connection and a service connection state management function associated with the target service identifier according to the target service identifier contained in the connection request, and invokes the network transport connection interface module; when the target module includes a second module and the second module includes a service routing management module and a service network policy mapping module, after acquiring the connection request from the first module, the service routing management module queries, in a service routing table, a latest destination service node Internet Protocol (IP) address corresponding to the target service identifier contained in the connection request, and acquires an egress router IP address and a service route corresponding to the latest destination service node IP address; and the service network policy mapping module selects a network layer route corresponding to the target service identifier and a network layer service level policy corresponding to the target service identifier.

In an exemplary embodiment, the service-agnostic service connection application programming interface contains identifiers of required resources and services and related attributes and parameters, and does not contain location information of a service node corresponding to the target service identifier.

In an exemplary embodiment, the service aware connection state management module is further configured to perform service connection state management on a connection according to the target service identifier contained in the connection request, wherein the service connection state management at least includes at least one of: mobility management, streaming media management, deterministic management, and multi-connection management.

In an exemplary embodiment, the service routing management module is further configured to acquire the service routing table corresponding to the target service identifier and the network layer service level policy corresponding to the target service identifier through a network centralized controller via an out-of-band method, or the service routing management module is further configured to acquire the service routing table corresponding to the target service identifier and the network layer service level policy corresponding to the target service identifier through distributed routing advertisement protocol.

In an exemplary embodiment, when the second module is located in a network edge ingress router, the service routing management module may query, in a service routing table, a latest destination service node IP address corresponding to the target service identifier contained in the connection request in the following manner: querying, according to the target service identifier, a service node IP address of an optimal service provider corresponding to a local service routing table; the service routing management module may acquire an egress router IP address and a service route corresponding to the latest destination service node IP address in the following manner: determining, according to the network layer service level policy corresponding to the target service identifier, the egress router IP address and the service route corresponding to a server of the service provider, wherein after the connection request reaches an egress router of the service provider, the egress router forwards the connection request to a final serving node of the service provider according to the target service identifier.

In an exemplary embodiment, the connection request further contains other supplementary parameters, wherein the other supplementary parameters include at least one of: an identity identifier for identity verification, a service type for fast policy indexing, and an associated network layer service level policy parameter for detailed queue scheduling.

In an exemplary embodiment, the terminal application may be configured to execute at least one of the following operations: before the target module acquires the connection request, the terminal application generates the target service identifier according to a predetermined algorithm; alternatively, before the target module acquires the connection request, the terminal application acquires the target service identifier from a cloud network integrated scheduling system, wherein the cloud network integrated scheduling system generates the target service identifier according to the predetermined algorithm.

In an exemplary embodiment, the cloud network integrated scheduling system is configured to execute the following operations: before the target module acquires the connection request, the cloud network integrated scheduling system receives a service registration request from a server that provides the target service; and the cloud network integrated scheduling system allocates the target service identifier to the server that provides the target service according to a predetermined algorithm.

It should be noted that each module may be implemented by software or hardware. The latter may be implemented in the following manner, but is not limited thereto. All the modules are located in a same processor; alternatively, the modules are located in different processors in an arbitrary combination.

The embodiments of the present disclosure also provide a computer-readable storage medium. The computer-readable storage medium stores a computer program, wherein the computer program, when running on a processor, causes the processor to execute the operations in any one of the described method embodiments.

In an exemplary embodiment, the computer-readable storage medium may include, but is not limited to, any medium that is able to store a computer program, such as a Universal Serial Bus (USB) flash drive, a Read-Only Memory (ROM), a Random Access Memory (RAM), a removable hard disk, a magnetic disk, or an optical disc.

The embodiments of the present disclosure further provide an electronic device, including a memory and a processor. The memory stores a computer program. The processor is configured to run the computer program to execute the operations in any one of the method embodiments.

In an exemplary embodiment, the electronic device may further include a transmission device and an input/output device, wherein the transmission device is connected to the processor, and the input/output device is connected to the processor.

For specific examples in the embodiment, reference may be made to the examples described in the foregoing embodiments and exemplary embodiments, and details are not repeatedly described in the embodiment.

Obviously, those having ordinary skill in the art should understand that each module or each operation of the present disclosure may be implemented by a universal computing device, they may be centralized on a single computing device or distributed on a network composed of a plurality of computing devices, they may be implemented by program codes executable by a computing device, and thus may be stored in a storage device and executed by the computing device. Furthermore, in some cases, the shown or described operations may be executed in an order different from that described here, or they are made into integrated circuit modules respectively, or a plurality of modules or operations therein are made into a single integrated circuit module for implementation. As such, the present disclosure is not limited to any particular hardware and software combination.

The foregoing descriptions are merely exemplary embodiments of the present disclosure, but are not intended to limit the present disclosure. For those having ordinary skill in the art, the present disclosure may have various modifications and variations. Any modifications, equivalent replacements, improvements and the like made within the principle of the present disclosure shall belong to the scope of protection of the present disclosure.

What is claimed is:

1. A connection establishment method, comprising:

acquiring, by a target module, a connection request, wherein the connection request is used for requesting establishment of a connection between a terminal application and a target service, and the connection request contains a target service identifier of the target service; and initiating, by the target module, the connection request to the target service based on the target service identifier to request the establishment of the connection between the terminal application and the target service, wherein:

when the target module comprises a first module and the first module comprises a service-agnostic service connection application programming interface, a service aware connection state management module, a service aware connection transport control module and a network transport connection interface module, the connection establishment method further comprises: after acquiring the connection request initiated by the terminal application via the service-agnostic service connection application programming interface, starting, by the service aware connection state management module, a handshake procedure for service connection and a service connection state management function associated with the target service identifier according to the target service identifier contained in the connection request, and invoking, by the service aware connection state management module, the network transport connection interface module; and when the target module comprises a second module and the second module comprises a service routing management module and a service network policy mapping module, the connection establishment method further comprises: after acquiring the connection request from the first module, querying, in a service routing table by the service routing management module, a latest destination service node Internet Protocol (IP) address corresponding to the target service identifier contained in the connection request, and acquiring, by the service routing management module, an egress router IP address and a service route corresponding to the latest destination service node IP address; and selecting, by the service network policy mapping module, a network layer route corresponding to the target service identifier and a network layer service level policy corresponding to the target service identifier.

2. The connection establishment method according to claim 1, wherein the service-agnostic service connection application programming interface contains identifiers of required resources and services and related attributes and parameters, and does not contain location information of a service node corresponding to the target service identifier.

3. The connection establishment method according to claim 1, further comprising: performing, by the service aware connection state management module, service connection state management on a connection according to the target service identifier contained in the connection request, wherein the service connection state management at least comprises at least one of: mobility management, streaming media management, deterministic management, and multi-connection management.

4. The connection establishment method according to claim 1, wherein the service routing management module acquires the service routing table corresponding to the target service identifier and the network layer service level policy corresponding to the target service identifier through a network centralized controller via an out-of-band method, or acquires the service routing table corresponding to the target service identifier and the network layer service level policy corresponding to the target service identifier through distributed routing advertisement protocol.

5. The connection establishment method according to claim 1, wherein when the second module is located in a network edge ingress router, querying, in a service routing table, a latest destination service node Internet Protocol (IP) address corresponding to the target service identifier contained in the connection request comprises: querying, according to the target service identifier, a service node IP address of an optimal service provider corresponding to a local service routing table; and acquiring an egress router IP address and a service route corresponding to the latest destination service node IP address comprises: determining, according to the network layer service level policy corresponding to the target service identifier, the egress router IP address and the service route corresponding to a server of the service provider, wherein after the connection request reaches an egress router of the service provider, the egress router forwards the connection request to a final serving node of the service provider according to the target service identifier.

6. The connection establishment method according to claim 1, wherein the connection request further contains other supplementary parameters, wherein the other supplementary parameters comprise at least one of:

an identity identifier for identity verification, a service type for fast policy indexing, and an associated network layer service level policy parameter for detailed queue scheduling.

7. The connection establishment method according to claim 1, wherein before acquiring, by a target module, a connection request, the connection establishment method further comprises one of:

generating, by the terminal application, the target service identifier according to a predetermined algorithm; or acquiring, by the terminal application, the target service identifier from a cloud network integrated scheduling system, wherein the cloud network integrated scheduling system generates the target service identifier according to the predetermined algorithm.

8. The connection establishment method according to claim 1, wherein before acquiring, by a target module, a connection request, the connection establishment method further comprises:

receiving, by a cloud network integrated scheduling system, a service registration request from a server that provides the target service; and allocating, by the cloud network integrated scheduling system, the target service identifier to the server that provides the target service according to a predetermined algorithm.

9. The connection establishment method according to claim 1, wherein the service identifier has a characteristic of being location and identity independent, wherein the service identifier having the characteristic of being location and identity independent refers to that the service identifier does not contain an identity of the service provider and location information of the service provider.

10. The connection establishment method according to claim 9, wherein the connection request is initiated in a Transport control Protocol (TCP) handshake procedure, and only contains the service identifier, so that the connection request is location and identity independent.

11. The connection establishment method according to claim 1, wherein the connection request contains the service identifier by extending a TCP port number and using extended bits to carry the service identifier.

12. The connection establishment method according to claim 11, wherein an identity identifier is placed in an extended header of Internet Protocol version 6 (IPv6) so that a terminal or an intermediate device performs identity verification.

13. The connection establishment method according to claim 1, wherein the connection request contains the service identifier by adding the service identifier into a TCP option field in a TCP header.

14. The connection establishment method according to claim 1, wherein the connection request is a Sync packet when a Socket connection is initiated, and the Sync packet carries the service identifier, wherein the service identifier identifies a service type and a service parameter.

15. A non-transitory computer-readable storage medium, wherein the computer-readable storage medium stores a computer program, and the computer program, when running on a processor, causes the processor to implement the following operations:

acquiring, by a target module, a connection request, wherein the connection request is used for requesting establishment of a connection between a terminal application and a target service, and the connection request contains a target service identifier of the target service; and initiating, by the target module, the connection request to the target service based on the target service identifier to request the establishment of the connection between the terminal application and the target service, wherein:

when the target module comprises a first module and the first module comprises a service-agnostic service connection application programming interface, a service aware connection state management module, a service aware connection transport control module and a network transport connection interface module, the computer program, when running on the processor, causes the processor to further implement the following operations: after acquiring the connection request initiated by the terminal application via the service-agnostic service connection application programming interface, starting, by the service aware connection state management module, a handshake procedure for service connection and a service connection state management function associated with the target service identifier according to the target service identifier contained in the connection request, and invoking, by the service aware connection state management module, the network transport connection interface module; and when the target module comprises a second module and the second module comprises a service routing management module and a service network policy mapping module, the computer program, when running on the processor, causes the processor to further implement the following operations: after acquiring the connection request from the first module, querying, in a service routing table by the service routing management module, a latest destination service node Internet Protocol (IP) address corresponding to the target service identifier contained in the connection request, and acquiring, by the service routing management module, an egress router IP address and a service route corresponding to the latest destination service node IP address; and selecting, by the service network policy mapping module, a network layer route corresponding to the target service identifier and a network layer service level policy corresponding to the target service identifier.

16. An electronic device, comprising:

a memory, a processor, and a computer program stored in the memory and capable of running on the processor, wherein the processor, when running the computer program, implements the following operations:

acquiring, by a target module, a connection request, wherein the connection request is used for requesting establishment of a connection between a terminal application and a target service, and the connection request contains a target service identifier of the target service; and initiating, by the target module, the connection request to the target service based on the target service identifier to request the establishment of the connection between the terminal application and the target service, wherein:

when the target module comprises a first module and the first module comprises a service-agnostic service connection application programming interface, a service aware connection state management module, a service aware connection transport control module and a network transport connection interface module, the processor, when running the computer program, further implements the following operations: after acquiring the connection request initiated by the terminal application via the service-agnostic service connection application programming interface, starting, by the service aware connection state management module, a handshake procedure for service connection and a service connection state management function associated with the target service identifier according to the target service identifier contained in the connection request, and invoking, by the service aware connection state management module, the network transport connection interface module; and when the target module comprises a second module and the second module comprises a service routing management module and a service network policy mapping module, the processor, when running the computer program, further implements the following operations: after acquiring the connection request from the first module, querying, in a service routing table by the service routing management module, a latest destination service node Internet Protocol (IP) address corresponding to the target service identifier contained in the connection request, and acquiring, by the service routing management module, an egress router IP address and a service route corresponding to the latest destination service node IP address; and selecting, by the service network policy mapping module, a network layer route corresponding to the target service identifier and a network layer service level policy corresponding to the target service identifier.

17. The electronic device according to claim 16, wherein the service-agnostic service connection application programming interface contains identifiers of required resources and services and related attributes and parameters, and does not contain location information of a service node corresponding to the target service identifier.

18. The electronic device according to claim 16, wherein the connection request further contains other supplementary parameters, wherein the other supplementary parameters comprise at least one of:

an identity identifier for identity verification, a service type for fast policy indexing, and an associated network layer service level policy parameter for detailed queue scheduling.

* * * * *